US011511704B2

(12) United States Patent
Berne

(10) Patent No.: US 11,511,704 B2
(45) Date of Patent: Nov. 29, 2022

(54) WINDSHIELD WIPER SYSTEM AND VEHICLE COMPRISING THIS SYSTEM

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/975,921

(22) PCT Filed: Feb. 27, 2018

(86) PCT No.: PCT/IB2018/000323
§ 371 (c)(1),
(2) Date: Aug. 26, 2020

(87) PCT Pub. No.: WO2019/166845
PCT Pub. Date: Sep. 6, 2019

(65) Prior Publication Data
US 2020/0398792 A1  Dec. 24, 2020

(51) Int. Cl.
*B60S 1/34* (2006.01)
*B60S 1/04* (2006.01)
*B60S 1/26* (2006.01)

(52) U.S. Cl.
CPC ........... *B60S 1/3404* (2013.01); *B60S 1/0463* (2013.01); *B60S 1/26* (2013.01); *B60S 1/3406* (2013.01)

(58) Field of Classification Search
CPC ........ B60S 1/3418; B60S 1/3497; B60S 1/44; B60S 1/0463; B60S 1/34; B60S 1/3406; B60S 1/3409

(Continued)

(56) References Cited

U.S. PATENT DOCUMENTS 3,644,956 A * 2/1972 Parker .................. B60S 1/3404
15/250.16
3,768,112 A * 10/1973 Kolb ..................... B60S 1/3404
15/250.21

(Continued)

FOREIGN PATENT DOCUMENTS

EP  1457398 A2   9/2004
EP  1571068 A1 * 9/2005 ............ B60S 1/0405

(Continued)

OTHER PUBLICATIONS

International Search Report and Written Opinion for International application No. PCT/IB2018/000323, dated Oct. 25, 2018, 8 pages.

*Primary Examiner* — Katina N. Henson
(74) *Attorney, Agent, or Firm* — Withrow & Terranova, PLLC

(57) ABSTRACT

A windshield wiper system (3, 3') for wiping a windshield (2) of a vehicle (1) includes a wiper (4) mounted on a movable support element, a guiding device for guiding the support element along a predefined trajectory and a motor mounted on the support element and arranged for providing traction power to move the support element along the predefined trajectory. The wiper system is arranged to move the wiper (4), relative to the windshield, with a translation movement between first and second positions, and with a rotation movement around a rotation axis perpendicular to the windshield between the second position and a third position.

10 Claims, 4 Drawing Sheets

(58) Field of Classification Search
USPC .......... 15/250.21, 250.24, 250.29; 296/96.21
See application file for complete search history.

(56) References Cited

U.S. PATENT DOCUMENTS

| | | | | |
|---|---|---|---|---|
| 8,615,840 B1* | 12/2013 | Taneda | ................ | B60S 1/3404 |
| | | | | 15/250.04 |
| 10,336,301 B2* | 7/2019 | Gaucher | .............. | B60S 1/3402 |

FOREIGN PATENT DOCUMENTS

| | | |
|---|---|---|
| JP | S58-202139 A | 11/1983 |
| JP | H11-180255 A | 7/1999 |

* cited by examiner

WINDSHIELD WIPER SYSTEM AND VEHICLE COMPRISING THIS SYSTEM

This application is a 35 USC 371 national phase filing of International Application No. PCT/IB2018/000323, filed Feb. 27, 2018, the disclosure of which is incorporated herein by reference in its entirety.

TECHNICAL FIELD OF THE INVENTION

The present invention relates to a windshield wiper blade system and to a vehicle including this system.

BACKGROUND OF THE INVENTION

Trucks and other industrial vehicles generally have large windshields in order to offer a large field of vision to a driver of the vehicle. In some cases, the windshields can have a curved shape, for example to provide a better lateral field of vision.

Windshields of such shapes and dimensions are difficult to clean with classical wiper blade systems, in which wiper blades are each hinged around a fixed point near the base of the windshield. In practice, the wiped surface is limited by the length of the wipers so that many regions of the windshield remain out of reach of the wipers and cannot be cleaned. Increasing the length of the wiper arms and blades is not always feasible, as it would require increasing the torque applied to the wipers and make them more prone to mechanical failure. Additionally, the rotating movement of the blade is not suited to curved surfaces.

FR 2 827 240 A1 discloses a wiper system for a curved windshield including a carriage carrying a wiper blade, which extends substantially vertically and which is capable of sliding along a rail. Actuating means are used for moving the carriage along the rail. However, the system is not well suited to large windshields. One of the reasons is that it requires the rail to extend along the entire length of the windshield, which complicates the integration of the system in the vehicle.

SUMMARY OF THE INVENTION

An object of the invention is therefore to propose a new windshield wiper system suited for large windshields.

The invention relates to a windshield wiper system according to claim 1.

Thanks to the invention, the windshield wiper is not anchored to a single rotation point of the vehicle, and instead can move along at least a portion of the windshield in translation in addition to pivoting relative to the windshield. This way, a larger surface of the windshield can be cleaned. Windshields of large dimensions and/or with curved shapes can also be cleaned. The guiding rail does not need to extend along the entire length of the windscreen, which takes less space and facilitates the integration of the system inside the vehicle.

According to advantageous aspects, embodiments of the invention include one or several of the features defined in claims 2 to 7.

The invention also relates to a vehicle comprising a windshield wiper system according to claim 8.

According to advantageous aspects, embodiments of the vehicle include one or several of the features defined in claims 9 and 10.

BRIEF DESCRIPTION OF THE DRAWINGS

The invention will be better understood upon reading the following description, provided solely as a non-limiting example, and made in reference to the appended drawings, in which.

DETAILED DESCRIPTION OF SOME EMBODIMENTS

Figure 1:
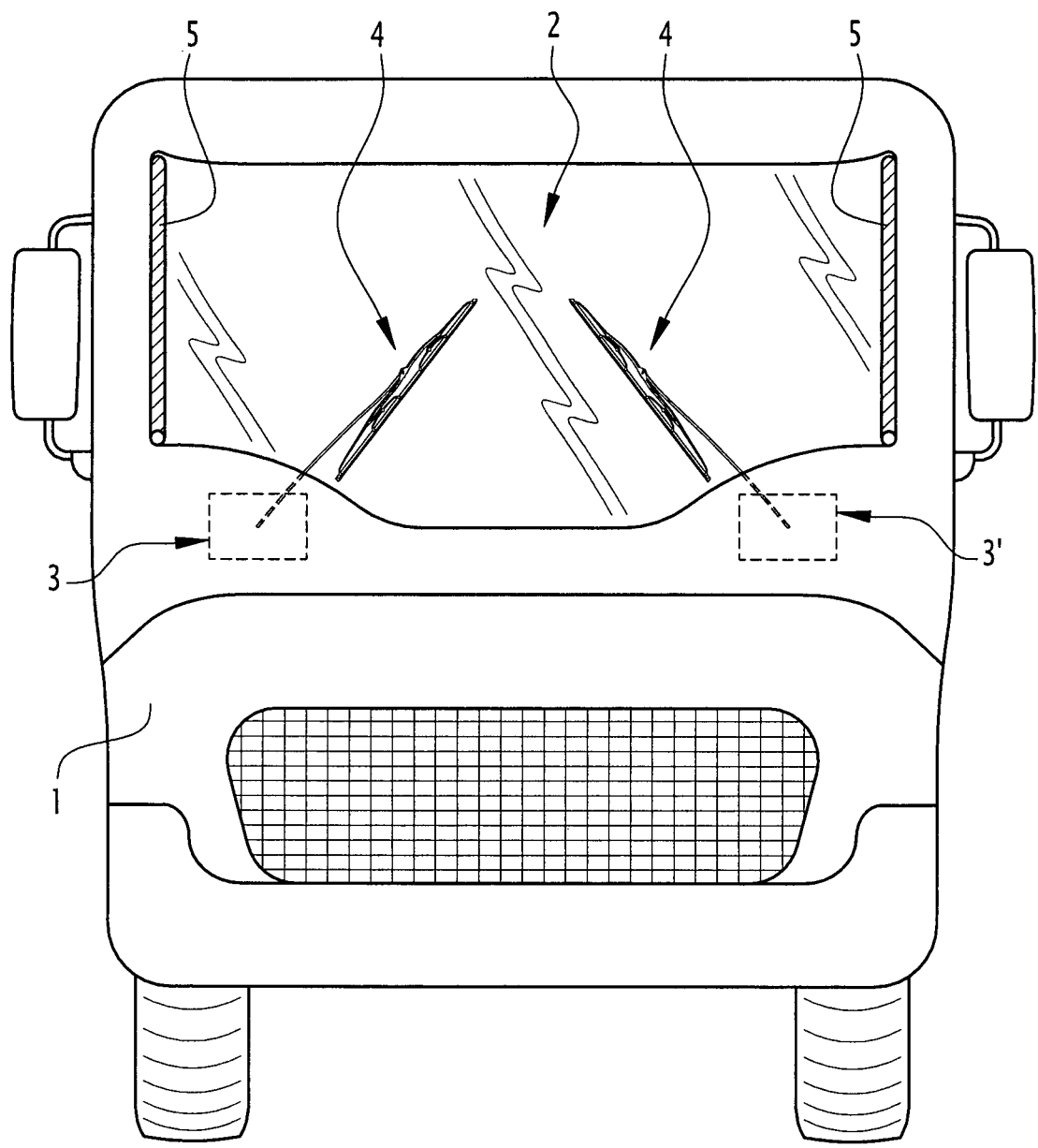
FIG. 1 is a simplified representation of a vehicle including a windshield wiper system according to the invention.

FIG. 1 illustrates a vehicle 1 comprising a windshield 2 and a windshield wiper system 3 including a wiper 4 for cleaning the windshield 2.

For example, the vehicle 1 is a road vehicle, such as a semi-trailer truck. However, the vehicle 1 can be any industrial vehicle, preferably a wheeled vehicle, such as a tractor, a dump truck, a military vehicle, a heavy-duty construction vehicle such as a loader, a bulldozer, an excavator, a compactor, a scraper or any equivalent vehicle.

The windshield 2, also named windscreen, is made of a transparent material, such as glass. For example, the windshield 2 is mounted on a forward face of the vehicle 1, for example on a driver's cabin of the vehicle 1. In the illustrated example, the windshield 2 is arranged along an essentially vertical direction.

The wiper system 3 is adapted to move the wiper 4 across the windshield 2, with an oscillating back-and-forth movement. The movement of the wiper 4 across the windshield 2 cleans the windshield 2 by wiping dew and/or rainwater and/or dust and/or other undesirable deposits off the windshield 2.

For example, the wiper system 3 is mounted on a cabin or a frame of the vehicle 1, near the windshield 2. Each wiper 4 includes a wiper arm 41 and a wiper blade 42. The wiper blade 42 is in contact with the surface of the windshield 2.

According to some embodiments, the vehicle 1 can include several wiper systems. For example, the vehicle 1 includes a second windshield wiper system 3' similar to the wiper system 3 and including its own wiper 4. This way the windshield 2 can be cleaned using several wipers 4, each of these wipers 4 being adapted to clean a specific portion of the windshield 2. For example, the wiper 4 of the wiper system 3 cleans a first wiped surface S1 and the wiper 4 of the wiper system 3' cleans a second wiped surface S2, as visible on FIG. 2. Since the wiper systems 3 and 3' are similar, only the wiper system 3 is described in detail in what follows. The operation of the wiper systems 3 and 3' is preferably coordinated, for example by an electronic control unit (not shown), in order to avoid collision between the wipers 4 of the wiper systems 3 and 3' during their operation. In alternative embodiments, the wipers systems 3 and 3' are part of a same wiper system.

More generally, the wiper system 3 is arranged to move the wiper 4, relative to the windshield 2, with a translation movement between a first position P1 and a second position P2, and with a rotation movement around a rotation axis perpendicular to the windshield 2 between the second position P2 and a third position P3. In other words, each cycle of the oscillating movement of the wiper 4 includes a first phase during which the wiper 4 is translated, and a second phase, during which the wiper 4 is rotated.

Figure 2:
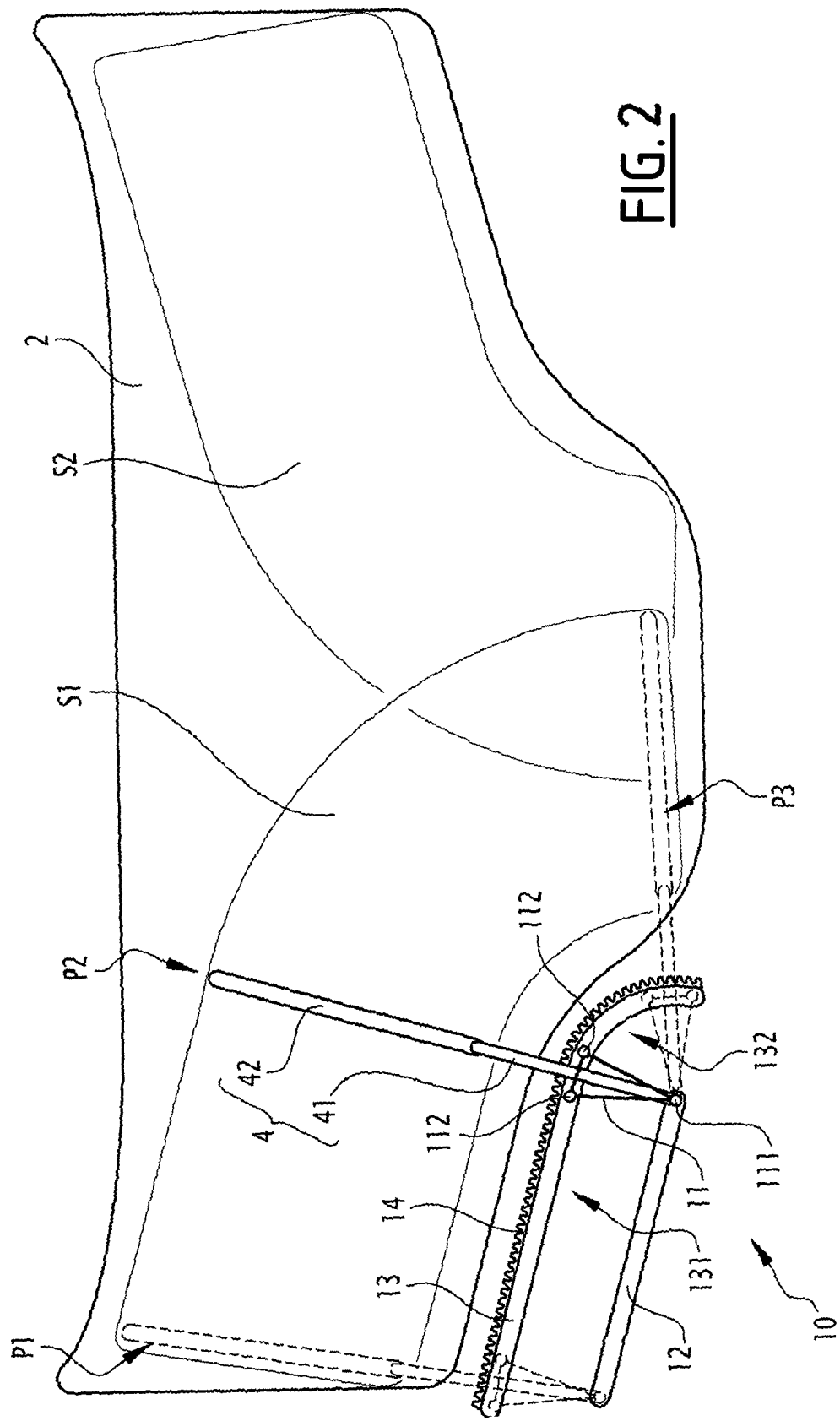
FIGS. 2 and 3 illustrate a windshield wiper system according to a first embodiment of the invention.
Figure 3:
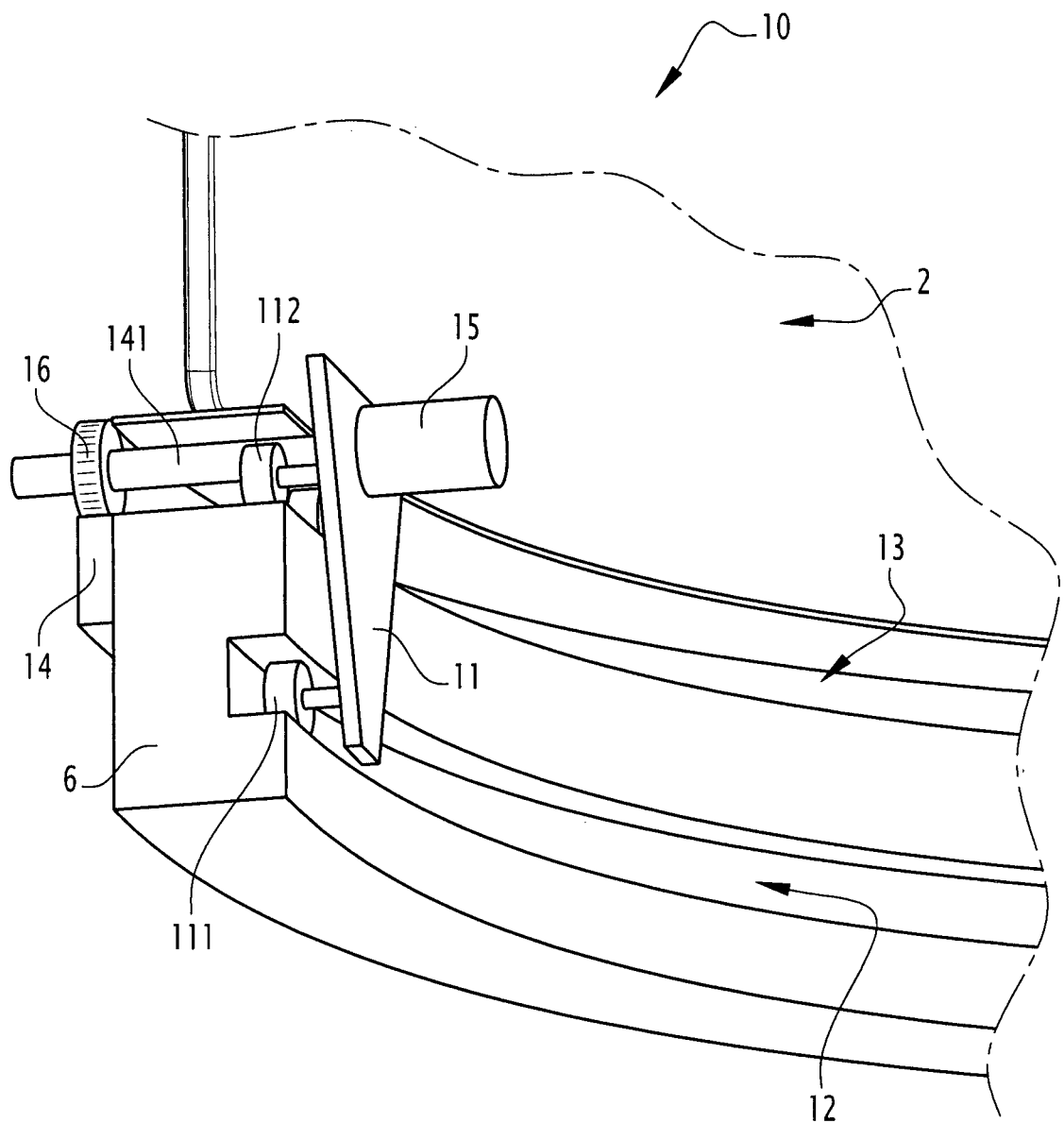

FIGS. 2 and 3 illustrate a first exemplary embodiment of the wiper system 3. In what follows, the wiper system according to the first embodiment bears the reference "10".

The wiper system 10 includes a movable support element 11, a guiding device for guiding the support element 11 along a predefined trajectory, and a motor 15 mounted on the support element 11. In this embodiment, the predefined trajectory corresponds to the translation between positions P1 and P2 and then the rotation between positions P2 and P3.

The wiper 4 is mounted on the support element 11. For example, the arm 41 of the wiper 4 is connected to the support element 11. Preferably, the wiper 4 is fixed on the support element 11 with no degree of freedom in rotation.

In this example, the support element 11 is a rigid support plate, made of metal or plastic. The illustrated support plate has a triangle shape, although other shapes are possible.

The guiding device includes a first rail 12 and a second rail 13. In this example, the guiding device also includes a rack 14 associated to the second rail 13, for example extending along the second rail 13.

The first rail 12 is adapted to guide the support element 11 in translation between the first and second positions P1, P2. For example, the first rail 12 has an essentially linear shape.

The second rail 13 comprises a first portion of rail 131 and a second portion of rail 132. The first portion of rail 131 is parallel to the first rail 12 and is adapted to guide the support element 11 in translation between the first and second positions P1 and P2. In the illustrated example, the translation between positions P1 and P2 corresponds to a translation along an essentially horizontal direction. In some embodiments, the length of the first portion of rail 131 is equal to the length of the first rail 12.

The second portion of rail 132 extends from the first portion of rail 131 with a curved shape around the rotation axis. The second portion of rail 132 is further adapted to guide the support element 11 in rotation around the rotation axis between the second and third positions P2, P3. For example, the length of the second rail 13 is greater than the length of the first rail 12.

Preferably, the rack 14 has a shape similar to the shape of the second rail, with a first portion and a second curved portion. For example, the rack 14 extends along the entire length of the second rail 13.

The motor 15 is adapted to provide traction power to move the support element 11 along the predefined trajectory. For example, the motor 15 has an output shaft 151 connected to a pinion 16 coupled to the rack 14. In other words, the motor 15 drives the pinion 16 by exerting a rotational torque. The pinion 16 and the rack 14 are coupled together to form a rack and pinion system which convert the rotation of the pinion 16 into a translation movement of the support element 11 along the length of the rack 14.

For example, the motor 15 is an electrical motor. The motor 15 is powered by an electrical supply, not illustrated. The motor 15 is adapted to rotate the pinion 16 in a forward direction or, alternatively, in a reverse direction. For example, the motor 15 is driven by an electronic command unit, not shown.

The support element 11 is provided with a first guiding wheel 111 engaged with the first rail 12 and with one or several second guiding wheels 112 engaged with the second rail 13.

The translation movement of the wiper 4 between the first and second positions P1, P2 corresponds to a translation movement of the support element 11 between first and second ends of both the first rail 12 and the first portion of rail 131.

In preferred embodiments, the first guiding wheel 111 acts as a pivot allowing the rotation of the support element 11 around the rotation axis when the wiper 4 is in the second position P2. In other words, when the support element 11 arrives at the end of the first rail 12 (i.e. when the guide wheel 111 arrives in abutment against the end of the first rail 12 and when the guide wheels 112 are at the end of the first portion of rail 131) the support element 11 continues nonetheless to move along the second portion of rail 132, thanks to the fact that the second portion of rail extends from the first portion of rail 131 with no discontinuity and thanks to the fact that the support element 11 can pivot around the rotation axis when arriving at the end of the first rail 12.

In this example, the pivot movement is allowed by the guide wheel 111. However, other embodiments are possible. For example, the support element 11 may be divided into two portions pivotally articulated relative to each other around an axis perpendicular to the windshield 2. Guide wheels 112 are mounted on a first portion and guide wheel(s) 111 is (are) mounted on the other portion. When the guide wheel(s) 111 arrive in abutment at the second end of the first rail 12, the first portion pivots relative to the second portion around the rotation axis, thus allowing the rotation movement from the second position P2 towards the third position P3.

Operation of the system 10 is now briefly described. Initially, the wiper 4 is in the first position P1. In the illustrated example, in the first position P1, the wiper 4 is at a lateral end of the windshield 2 with an essentially vertical position of the wiper blade 42. Then, the wiper 4 is moved to the second position P2, by activating the motor 15. The motor 15 rotates the pivot 16 in a forward direction. The support element 11 moves along the first rail 12 and the first portion 131 of the second rail 13 until reaching the second position P2: Then, at this point, the support element 11 arrives at the end of the first rail 12 (e.g. the wheel 111 abuts against the end of the first rail 12). The motor 15 continues to rotate the pinion 16 in the same direction and the support element 11 continues to advance along the second portion 132 of the second rail 13 towards the third position P3, while the support element 11 pivots around the rotation axis. The movement continues until the support element 11 reaches the third position P3. Then, the support element 11 moves in reverse along the same path, first towards the second position P2 and then towards the first position P1. For example, the motor 15 rotates the pivot 16 in the opposite direction. Once the wiper 4 is back in the first position P1, the same movement can be repeated once or several times.

In some embodiments, the wiper 4 is rotated several times between the second position P2 and the third position P3 before returning towards the first position P1. In that case, the control unit drives the motor 15 so as to move continuously the support element back and forth between the second and third positions P2 and P3.

For example, this mode of operation is commanded by the driver of the vehicle 1 in case of heavy rain or dust storm or any similar condition requiring the central region of the windshield 2 (i.e. in this case, the region cleaned by the rotation movement of the wiper 4 between the second and third positions P2 and P3) to be cleaned more frequently than the peripheral portions of the windshield 2 (i.e. the regions cleaned by the translation movement of the wiper 4 between the first and second positions P1 and P2).

In some embodiments, the windshield 2 can be curved, as visible in FIG. 3. For example, the windshield 2 has curved portions (eg. at lateral ends) which are at least partially folded around a vertical axis. In that case, the guiding system is preferentially adapted to follow the curvature of the windshield 2. For example, if the windshield 2 includes a curve portion located at a lateral end of the windshield 2, then the corresponding portion of the first rail 12 and of the first portion 131 of the second rail 13 are curved correspondingly around a corresponding vertical axis.

Figure 4:
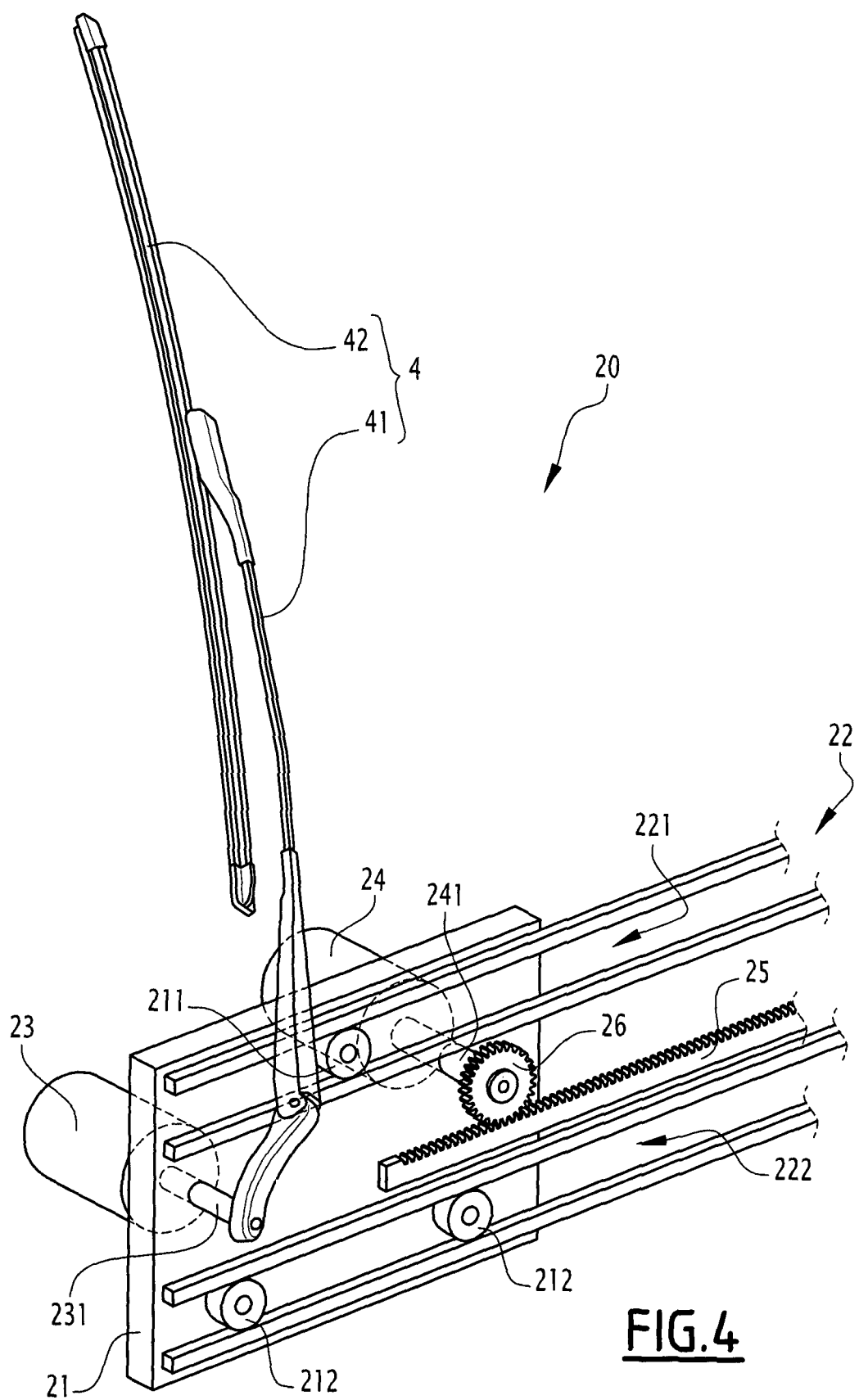
FIG. 4 illustrates a windshield wiper system according to a second embodiment of the invention.

FIG. 4 illustrates a second exemplary embodiment of the wiper system 3. In what follows, this second embodiment bears the reference "20". The elements of this wiper system 20 which are similar to the wiper system 10 bear the same references and are not described in detail in what follows, given that the description above can be transposed to these elements. Thus, only the major differences between the wiper systems 20 and 10 are described below.

The wiper system 20 includes a movable support element 21, a guiding device 22 for guiding the support element 21 along a predefined trajectory, a first motor 24 mounted on the support element 11 and a second motor 23 mounted on the support element 21. In this embodiment, the predefined trajectory corresponds to the translation between positions P1 and P2.

In this example, the support element 21 is a rigid support plate, made of metal or plastic. The illustrated support plate has a rectangle shape, although other shapes are possible.

The guiding device 22 includes at least one guiding rail adapted to guide the support element 21 in translation between the first and second positions P1, P2. In this example, the guiding device 22 includes two such rails 221 and 222, lying parallel to each other. For example, the rails 221 and 222 are attached to a body or to a fixed frame of the cabin of the vehicle 1.

The support element 21 is provided with guiding wheels 211 and 212 which cooperate with the guiding rail(s) of the guiding device for allowing the translation movement of the support element 21. For example, guiding wheels 211 cooperate with the rail 221 and guiding wheels 212 cooperate with the rail 222.

The first motor 24 is adapted to provide traction power to move the support element 21 along the predefined trajectory. For example, the guiding device 22 further includes a rack 25 and the first motor 24 drives an output shaft 241 attached to a pinion 26 coupled to the rack 25. In this example, the rack 25 lies parallel with the rails 221 and 222.

The second motor 23 is adapted to rotate the wiper 4 around the rotation axis. In this example, the output shaft 231 of the second motor 23 is connected to the wiper arm 41.

In other words, the movement of the wiper 4 between the first and second positions P1 and P2 is obtained by moving in translation the support element 21 in translation between opposite ends of the rails 221 and 222. The rotation of the wiper 4 between the second and third positions P2 and P3 is obtained by activating the second motor 23. For example, the second motor 23 is activated only once the support element 21 is located in the second position P2. In some embodiments, the wiper 4 is rotated several times between the second position P2 and the third position P3 before returning towards the first position P1, as explained above.

According to some embodiments, if the windshield 2 is curved as previously described, then the guiding system 22 is preferentially adapted to follow the curvature of the windshield 2. For example, if a curved portion is located at a lateral end of the windshield 2, then the corresponding portion of the rails 221 and 222 are curved correspondingly around a corresponding vertical axis in order to follow the curved portion of the windshield 2.

Referring back to FIG. 1, according to some advantageous embodiments, the vehicle 1 further includes at least one protection screen 5 arranged at an edge of the windshield 2. The protection screen 5 is being adapted to hide the wiper 4 when the wiper is in the first position P1. The screen 5 can be used with any of the wiper systems 10 and 20.

The shape of the screen 5 is preferably complementary with the shape of the wiper 4. The spatial arrangement of the screen 5 relative to the windshield 2 depends on how the wiper 4 is arranged spatially when in the first position P1. In the illustrated example, the screens 5 have an elongated shape and are arranged vertically at lateral ends of the windshield 2.

The protection screens 5 are preferably opaque. In some examples, each screen 5 includes a cover attached to the vehicle 1. In some other examples, the screens 5 are integrated with the body of the vehicle 1.

According to some embodiments, the vehicle 1 includes two similar or identical protection screens 5, each located at a lateral edge of the windshield 2 and each associated to one of the wipers 4. In the illustrated example, a first screen 5 is placed at the leftmost lateral edge of the windscreen 2 for receiving the wiper 4 associated to the first wiper system 3. A second screen 5 is placed at the rightmost lateral edge of the windscreen 2 for receiving the wiper 4 associated to the second wiper system 3'.

The protection screens 5 can however be omitted.

The embodiments and alternatives described above may be combined with each other in order to generate new embodiments of the invention.

The invention claimed is:

1. A windshield wiper system for wiping a windshield of a vehicle, wherein the wiper system includes:
   a wiper mounted on a movable support element;
   a guiding device for guiding the support element along a predefined trajectory; and
   a motor mounted on the support element providing traction power to move the support element along the predefined trajectory;
   wherein:
   the wiper system is configured to move the wiper, relative to the windshield, with a translation movement between first and second positions, and with a rotation movement around a rotation axis perpendicular to the windshield between the second position and a third position, and
   in operation, each cycle of the oscillating movement of the wiper includes a first phase during which the wiper is translated, and a second phase, during which the wiper is rotated.

2. The wiper system of claim 1, wherein:
   the guiding device includes a first rail and a second rail;
   the first rail is configured to guide the support element in translation between the first and second positions; and
   the second rail comprises a first portion of the second rail and a second portion of the second rail, the first portion of the second rail being parallel to the first rail and configured to guide the support element in translation between the first and second positions, and the second portion of the second rail extending from the first portion of the second rail with a curved shape around the rotation axis, the second portion of the second rail being further configured to guide the support element in rotation around the rotation axis between the second and third positions.

3. The wiper system of claim 1, further comprising a first guiding wheel engaged with the first rail and one or several second guiding wheels engaged with the second rail, the first guiding wheel acting as a pivot allowing a rotation movement of the support element around the rotation axis when the wiper is moved between the second position and the third position.

4. The wiper system of claim 1, wherein the wiper is fixed on the support element with no degree of freedom in rotation.

5. The wiper system of claim 1, wherein the guiding device includes at least one linear guiding rail configured to guide the support element in translation between the first and second positions, and wherein the wiper system further includes an additional motor mounted on the support element and connected to the wiper so as to rotate the wiper around the rotation axis.

6. The wiper system of claim 1, wherein the motor is an electric motor.

7. The wiper system of claim 1, wherein the guiding device includes a rack and the motor drives a pinion coupled to the rack.

8. A vehicle including a windshield and a windshield wiper system for cleaning the windshield, wherein the wiper system includes:
  a wiper mounted on a movable support element;
  a guiding device for guiding the support element along a predefined trajectory; and
  a motor mounted on the support element providing traction power to move the support element along the predefined trajectory;
  wherein:
  the wiper system is configured to move the wiper, relative to the windshield, with a translation movement between first and second positions, and with a rotation movement around a rotation axis perpendicular to the windshield between the second position and a third position, and
  in operation, each cycle of the oscillating movement of the wiper includes a first phase during which the wiper is translated, and a second phase, during which the wiper is rotated.

9. The vehicle of claim 8, further comprising a protection screen arranged at an edge of the windshield and being configured to hide the wiper of the wiper system when the wiper is in the first position.

10. The vehicle of claim 8, wherein the vehicle is an industrial vehicle.

* * * * *